Figure 1:
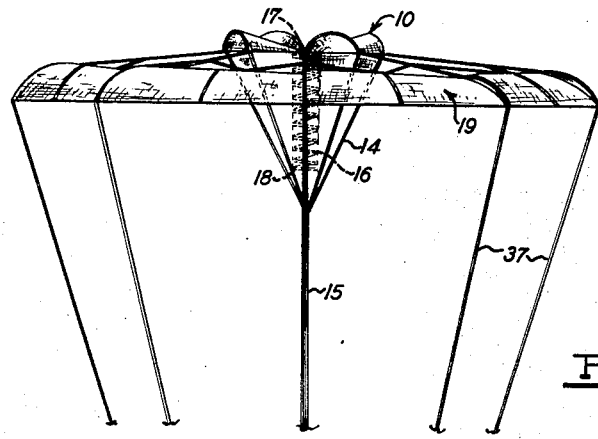

Aug. 16, 1960  O. W. SEPP, JR  2,949,266
ROTATING PARACHUTE
Filed Feb. 5, 1959  2 Sheets-Sheet 1

INVENTOR
OSCAR W. SEPP, JR.
BY Jacobi & Jacobi
ATTORNEYS

Aug. 16, 1960 O. W. SEPP, JR 2,949,266
ROTATING PARACHUTE
Filed Feb. 5, 1959
2 Sheets-Sheet 2
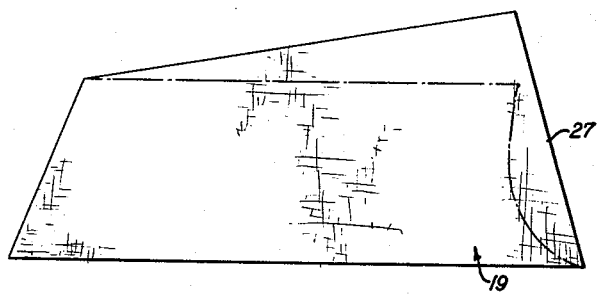
Fig.4
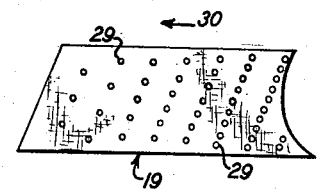
Fig.5
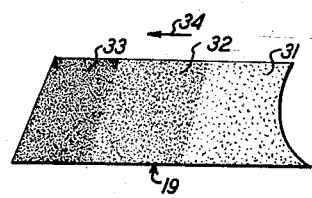
Fig.6
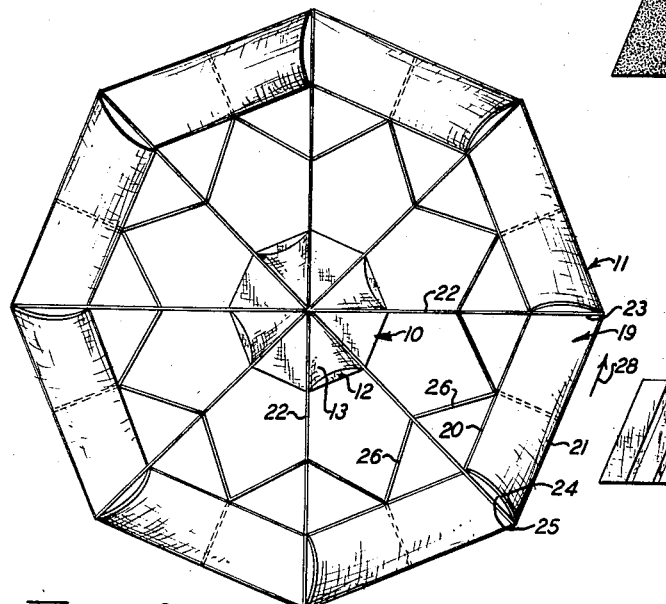
Fig.2
Fig.7
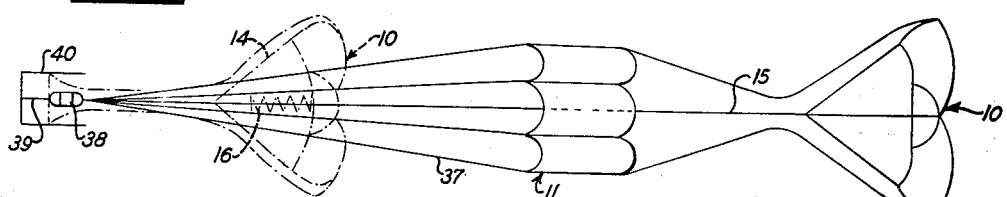
Fig.8
INVENTOR
OSCAR W. SEPP, JR
BY Jacobi & Jacobi
ATTORNEYS

United States Patent Office 2,949,266
Patented Aug. 16, 1960

2,949,266

ROTATING PARACHUTE

Oscar W. Sepp, Jr., Dayton, Ohio, assignor to M. Steinthal & Co., Inc., New York, N.Y., a corporation of New York Filed Feb. 5, 1959, Ser. No. 791,299

12 Claims. (Cl. 244—145)

This invention relates to aeronautics and more particularly to a rotating parachute primarily intended for use as an aircraft deceleration device, a cargo parachute or for a deceleration or stabilization device for the recovery of missiles, rockets or their components.

It is well known that parachutes of the rotating type are more efficient and provide a greater drag for a given canopy area than conventional types of parachutes but considerable difficulty has been experienced with rotating type parachutes heretofore proposed and tested in that the design of these devices was relatively complex and the structure was such that deployment and inflation of the parachute was somewhat uncertain and furthermore, in order to provide for proper inflation, it was found necessary to utilize a greater canopy area than was necessary to produce the drag desired. These prior art rotating parachutes utilized the same principle of inflation as conventional parachutes in that upon deployment the canopy assumed substantially a tear-drop shape and inflation depended on air pressure expanding the canopy against the tension in the shroud lines until full inflation had been accomplished. Consequently, in order to provide for proper inflation, it was necessary to utilize a relatively great canopy area in order to provide sufficient drag when partially inflated to overcome the tension in the shroud lines sufficient to produce full inflation of the canopy. Even with a relatively large canopy area it was difficult to provide for relatively rapid inflation and consequently, these prior art parachutes of the rotating type were less efficient than the inherent capabilities of this type of parachute and furthermore, the necessity for providing a relatively great canopy area materially increases the cost of manufacture of such a parachute and consequently any improvement which results in a material reduction in the canopy area while still providing for rapid deployment and inflation and at the same time providing sufficient drag represents a material contribution to the art.

It is accordingly an object of the invention to provide a parachute of the rotating type utilizing a minimum canopy area and providing for rapid deployment and inflation.

A further object of the invention is the provision of a parachute of the rotating type having a drag coefficient more than twice that of a conventional non-rotating parachute with equal fabric area.

A still further object of the invention is the provision of a parachute of the rotating type including an inflating cap and a circular band type canopy and in which inflation of the circular band canopy is accomplished in a relatively short time due to the minimal tension in the shroud lines during inflation of the circular band canopy.

Another object of the invention is the provision of a parachute of the rotating type including an inflating cap and a circular band type canopy and in which the inflating cap provides the necessary drag for deployment of the circular band canopy thereby eliminating the necessity for providing a pilot chute.

A further object of the invention is the provision of a parachute of the rotating type including an inflating cap and a circular band type canopy and in which the circular band canopy is composed of a plurality of fabric panels arranged in such a manner as to provide turbine type blades for accomplishing rotation of the parachute and in which the panels when inflated assume an airfoil configuration to increase the drag coefficient.

A still further object of the invention is the provision of a parachute of the rotating type including an inflating cap and a circular band type canopy and in which the circular band canopy is composed of a plurality of fabric panels providing turbine type blades for causing rotation of the parachute and in which the porosity of each fabric panel varies from one end to the other.

Another object of the invention is the provision of a parachute of the rotating type including an inflating cap and a circular band type canopy and in wich the circular band canopy is composed of a plurality of fabric panels providing turbine type blades for rotating the parachute and in which the porosity of each panel is varied from one end to the other, such porosity being varied by providing a varying number of vent apertures in each panel from one end to the other.

A further object of the invention is the provision of a parachute of the rotating type including an inflating cap and a circular band type canopy and in which the circular band canopy is composed of a plurality of fabric panels providing turbine type blades for rotating the parachute, the porosity of each panel being varied from one end to the other by applying a varying number of coats of plastic material to the panel from one end to the other.

A still further object of the invention is the provision of a parachute of the rotating type including an inflating cap and a circular band type canopy and in which the circular band canopy is composed of a plurality of fabric panels providing turbine type blades for rotating the parachute, the porosity of each panel being varied by the application of additional strips of fabric material to the panel in spaced transverse relationship.

Another object of the invention is the provision of a parachute of the rotating type in which means is provided for preventing inversion of the circular band canopy during inflation.

A further object of the invention is the provision of a parachute of the rotating type including an inflating cap and a circular band type canopy and in which a single tension line is connected to the inflating cap for absorbing the entire load during deployment and inflation thereby removing load or drag from the shroud lines and permitting rapid inflation of the circular band canopy without the necessity of overcoming drag on the shroud lines.

Figure 3:
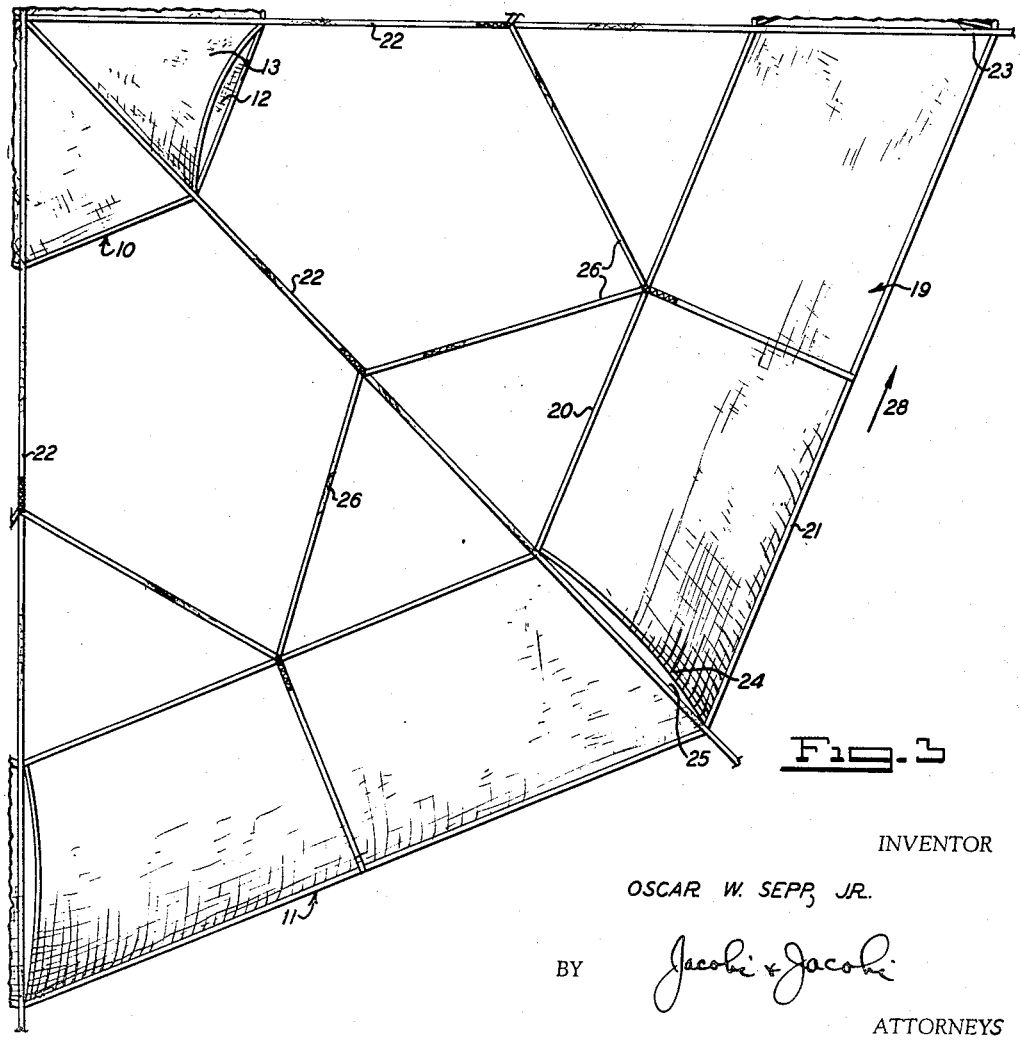

Further objects and advantages of the invention will be apparent from the following description taken in conjunction with the accompanying drawings wherein:

Fig. 1 is a side elevational view of a rotating parachute constructed in accordance with this invention and showing the same in inflated operable condition;

Fig. 2 a top plan view of the inflated rotating parachute shown in Fig. 1;

Fig. 3 is a fragmentary perspective view to an enlarged scale showing a portion of the inflating cap and circular band type canopy in inflated condition as well as the radial tapes connecting the inflating cap and circular band type canopy and the diagonal tapes for preventing inversion of the circular band type canopy during inflation;

Fig. 4 a plan view showing in full lines the blank from which each fabric panel of the circular band type canopy is constructed and showing in dotted lines the configuration of the panel as incorporated in the canopy;

Fig. 5 a plan view of a canopy panel showing the manner in which the porosity of the panel is varied by providing a number of vent apertures therein;

Fig. 6 a view similar to Fig. 5 and showing a method of varying the porosity of the panel by providing a varying number of coats of plastic material thereon;

Fig. 7 a view similar to Fig. 5 and showing a method of varying the porosity of the panel by securing additional strips of fabric material to the panel in spaced transverse relationship; and Fig. 8 a diagrammatic view showing in dotted lines the inflating cap subsequent to ejection from the parachute container and showing in full lines the inflating cap and circular band type canopy fully deployed but prior to inflation of the circular band type canopy.

With continued reference to the drawings, there is shown a rotating parachute constructed in accordance with this invention and which may well include an inflating cap 10 and a circular band type canopy 11 arranged in concentric relationship to the inflating cap 10. The inflating cap 10 may well comprise a generally circular fabric base 12 to the upper surface of which is secured a plurality of radially disposed generally triangular panel 13. The panels are secured along two side edges to the base 12 and are free at the other edge and in conjunction with the base 12 provide cups which when inflated as shown in Figs. 1 and 2, are of substantially half cone configuration. A plurality of lines 14 are secured at spaced points to the peripheral edge of the base 12 and the lines 14 terminate in a single tension line 15 disposed in alignment with the center of the base 12 of the inflating cap 10. The purpose and operation of the tension line 15 will be later described. Also if desired, there may be provided a compression spring 16 having one end 17 abutting the lower surface of the base 12 of the inflating cap 10 and the opposite end 18 secured in any suitable manner to the lines 14 connected to the base 12 and the tension line 15. The purpose and operation of the compression spring 16 will be later described.

The circular band type canopy 11, as best shown in Figs. 2 and 3, may well comprise a plurality of elongated fabric panels 19 secured together in an end to end relationship to provide a band surrounding the cap 10 in spaced concentric relation thereto. The inner and outer edges 20 and 21 of each panel 19 are substantially parallel and a plurality of radial tapes 22 serve to connect the inflating cap 10 and the circular band type canopy 11. One end 23 of each panel 19 is secured to a radial tape 22 while the opposite end 24 of each panel 19 is free between the inner and outer edges 20 and 21 to provide an opening 25 for the passage of air in a direction substantially at right angles to a diameter of the band 11. The inner and outer side edges 20 and 21 of each panel 19 are secured to a radial tape 22 adjacent the end edges of the end 24 of the panel 19 as clearly shown in Figs. 2 and 3. Diagonal tapes 26 are secured to the inner edge 20 of each panel 19 substantially midway between the ends thereof and the diagonal tapes 26 are also secured to the radial tape 22 between the inner edges 20 of the panels 19 of the band 11 and the outer periphery of the inflating cap 10. These diagonal tapes 26 are for the purpose of preventing inversion of the circular band canopy 11 during deployment and inflation thereof.

Each panel 19 of the circular band type canopy 11 is formed from a blank of fabric material 27 having substantially the shape shown in full lines in Fig. 4 and upon fabrication of the blank 27 into a panel 19 to form the circular band type canopy 11, the panel assumes the shape shown in dotted lines in Fig. 4. It is also to be noted that each panel 19 when inflated by movement of the parachute through the air, provides a turbine type blade which results in rotation of the parachute in the direction of the arrow 28 shown in Fig. 2 and furthermore, each panel 19 provides an upper surface having an airfoil configuration. While the airfoil configuration of each panel 19 may be provided by the cut of the blank forming such panel, nevertheless it is desirable to vary this airfoil configuration for different applications or uses and also to insure that such configuration will be maintained even though the fabric forming the panels 19 might possibly shrink or stretch which would operate to inadvertently change the airfoil configuration and possibly to an undesirable extent. In order to provide for the proper airfoil configuration and to permit changing of the same for specific uses or applications while utilizing the same original blank outline 27 for the panels 19, there is shown in Figs. 5, 6 and 7 three different methods for accomplishing this purpose, all of which are effective but some of which may be more desirable than others for certain specific uses.

As shown in Fig. 5, the panel 19 may be provided with a plurality of vent apertures 29 and as shown in this figure, a greater number of such apertures are provided adjacent the right hand or trailing end of the panel 19 than at the front or leading edge of the panel 19 when incorporated in a parachute constructed in accordance with this invention and with rotation of the parachute in the direction of the arrow 30. The number and spacing of the vent apertures 29 may of course be varied as desired in order to provide the proper airfoil configuration for the upper surface of the panel 19.

A second method of varying the porosity of the panel 19 is shown in Fig. 6 in which one or more coats of a plastic material are applied to the area 31 adjacent the trailing end of the panel 19, a greater number of coats of such plastic material being applied to the center section 32 of the panel 19 and an even greater number of coats of plastic material applied to the portion 33 adjacent the leading edge of the panel 19 when incorporated in a rotating parachute rotating in the direction of the arrow 34 shown in Fig. 6. Obviously, the number of coats of plastic material and disposition thereof on the panel 19 may be varied in order to vary the airfoil contour thereof as desired.

A third method of varying the porosity of the panel 19 is shown in Fig. 7 in which a plurality of strips of fabric material 35 are applied to the surface of the panel 19, it being noted as shown in Fig. 7, that the strip 35 adjacent the trailing edge of the panel 19 are of less width and more widely spaced than the strips adjacent the leading edge of the panel 19 when incorporated in a rotating parachute and rotating in the direction of the arrow 36, as shown in Fig. 7. The number of strips 35 and the spacing thereof may, of course, be varied as desired in order to provide the proper airfoil configuration for the surface of the panel 19.

Conventional shroud lines 37 are connected to the outer periphery of the circular band canopy 11 as shown in Fig. 1 and the opposite ends of the shroud lines 37 are connected to a suitable swivel 38 which as shown diagrammatically in Fig. 8, may be connected by a suitable riser 39 to a container 40 installed in an aircraft, missile, cargo or other object to which the parachute of this invention may be attached and also the tension line 15 connected to the lines 14 secured to the inflating cap 10 is connected to the swivel 38 as clearly shown in Fig. 8.

In operation and with particular reference to Fig. 8, it may be assumed that the parachute of this invention is stowed in the container 40 and that the spring 16 is in compressed condition. Upon release of the cover or other means which hold the parachute in the container 40, the spring 16 will operate to eject the inflating cap 10 therefrom and upon entering the air-stream, the cups provided by the panels 13 on the inflating cap 10 will fill with air and operate to pull the inflating cap entirely out of the container 40, whereupon air will also impinge on the base 12 of the inflating cap 10 which will operate to pull the circular band type canopy 11 from the container 40 and the inflating cap 10 will move outwardly until the tension line 15 prevents further outward movement thereof. The initial phase of deployment from the container 40 is shown in dotted lines in Fig. 8 and the inflating cap 10 as well as the circular band type canopy 11 is shown in the extreme outward position prior to inflation of the canopy 11. At this time, the entire load exerted by the inflating cap 10 is absorbed by the tension line 15 and consequently, there is little or no load on the shroud lines 37 connected to the circular band type canopy 11. Consequently, the canopy 11 is free to inflate without load thereon and such inflation takes place in an extremely short period of time to provide a completely inflated parachute as shown in Figs. 1 and 2. Movement of such parachute through the air will result in the movement of air through the openings 25 provided at the trailing end of each panel 19 which causes such panels to operate in a manner similar to that of turbine blades which in turn causes rotation of the entire parachute in the direction of the arrow 28 as shown in Fig. 2. This rotary movement will result in providing an increased drag due to the airfoil configuration of the panels 19 and also due to the energy absorbed during rotation of the parachute with the result that the total drag exerted by the parachute of this invention is greater than twice that of a conventional parachute having the same canopy area. It will thus be seen that a parachute of smaller dimensions for providing a given drag may be employed by utilizing the principles of this invention and this, of course, results in a materially reduced cost of construction and also materially reduces the effort required in packing the parachute after each use. During deployment and inflation of the parachute of this invention, the diagonal tapes 26 will prevent inversion of the panels 19 thereby insuring that the parachute will properly inflate and in a minimum of time.

While a compression spring 16 has been shown by way of illustration for intially ejecting the inflating cap 10 from the container 40, obviously other suitable methods may be utilized for removing the inflating cap 10 from the container 40.

It will be seen that by the above described invention, there has been provided an improved rotating type of parachute in which means is provided for ensuring rapid and proper inflation of the entire parachute, this being accomplished by removal of load from the shroud lines of the main canopy prior to inflation thereof and furthermore there has been provided a parachute which may be easily packed and which will properly inflate without inversion and one in which the amount of material required is radically reduced when compared to that necessary for a conventional parachute of equivalent drag characteristics.

It will be obivous to those skilled in the art that various changes may be made in the invention without departing from the spirit and scope thereof and therefore the invention is not limited by that which is shown in the drawing and described in the specification, but only as indicated in the appended claims.

What is claimed is:

1. A rotating parachute including an inflating cap and a circular band type canopy, said inflating cap comprising a generally circular fabric base, a plurality of radially disposed cups of half cone configuration on the upper surface of said base and a plurality of lines secured to the peripheral edge of said base at spaced points and terminating in a single tension line disposed in alignment with the center of said base, said circular band type canopy comprising a plurality of elongated fabric panels secured together in end to end relationship to provide a band surrounding said cap in spaced relation thereto, the inner and outer edges of each panel being substantially parallel, one end of each panel being free between the inner and outer edges to provide an opening for the passage of air in a direction substantially at right angles to a diameter of said band, each panel when inflated providing an upper surface having an airfoil configuration, radial tapes connecting the peripheral edge of said cap and the ends of each panel, diagonal tapes secured to said radial tapes between the inner periphery of said band and the peripheral edge of said cap and secured to the inner edge of each panel substantially midway between the ends to prevent inversion of said circular band type canopy during inflation and shroud lines connected to the outer periphery of said band at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

2. A rotating parachute as defined in claim 1 in which the porosity of the material of each panel increases from the closed end to the open end.

3. A rotating parachute as defined in claim 2 in which the porosity of each panel is varied by additional strips of fabric secured to said panel in spaced transverse relationship.

4. A rotating parachute as defined in claim 2 in which the porosity of each panel is varied by providing a varying number of coats of plastic material on each panel from one end to the other.

5. A rotating parachute as defined in claim 2 in which the porosity of each panel is varied by providing a varying number of vent apertures in each panel from one end to the other.

6. A rotating parachute including an inflating cap and a circular band type canopy, said inflating cap comprising a generally circular fabric base, a plurality of radially disposed cups on the upper surface of said base and a plurality of lines secured to said base and terminating in a single tension line disposed in alignment with the center of said base, said circular band type canopy comprising a plurality of elongated fabric panels secured together in end to end relationship to provide a band surrounding said cap in spaced relation thereto, the inner and outer edges of each panel being substantially parallel, one end of each panel being free between the inner and outer edges to provide an opening for the passage of air in a direction substantially at right angles to a diameter of said band, each panel when inflated providing an upper surface having an airfoil configuration, radial tapes connecting the peripheral edge of said cap and the ends of each panel, diagonal tapes secured to said radial tapes between the inner periphery of said band and the peripheral edge of said cap and secured to the inner edge of each panel substantially midway between the ends to prevent inversion of said circular band type canopy during inflation and shroud lines connected to the outer periphery of said band at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

7. A rotating parachute including an inflating cap and a circular band type canopy, said inflating cap comprising a generally circular fabric base, a plurality of radially disposed cups on the upper surface of said base and a plurality of lines secured to said base and terminating in a single tension line disposed in alignment with the center of said base, said circular band type canopy comprising a plurality of elongated fabric panels secured together in end to end relationship to provide a band surrounding said cap in spaced relation thereto, the inner and outer edges of each panel being substantially parallel, one end of each panel being free between the inner and outer edges to provide an opening for the passage of air in a direction substantially at right angles to a diameter of said band, each panel when inflated providing an upper surface having an airfoil configuration, radial tapes connecting the pheripheral edge of said cap and the ends of each panel, diagonal tapes secured to said radial tapes between the inner periphery of said band and the peripheral edge of said cap and secured to the inner edge of each panel to prevent inversion of said circular band type canopy during inflation and shroud lines connected to the outer periphery of said band at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

8. A rotating parachute including an inflating cap and a circular band type canopy, said inflating cap comprising a fabric base, a plurality of cups on the upper surface of said base and a plurality of lines secured to said base and terminating in a single tension line disposed in alignment with the center of said base, said circular band type canopy comprising a plurality of elongated fabric panels secured together in end to end relationship to provide a band surrounding said cap in spaced relation thereto, the inner and outer edges of each panel being substantially parallel, one end of each panel being free between the inner and outer edges to provide an opening for the passage of air in a direction substantially at right angles to a diameter of said band, each panel when inflated providing an upper surface having an airfoil configuration, radial tapes connecting the peripheral edge of said cap and the ends of each panel, diagonal tapes secured to said radial tapes between the inner periphery of said band and the peripheral edge of said cap and secured to the inner edge of each panel to prevent inversion of said circular band type canopy during inflation and shroud lines connected to the outer periphery of said ring at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

9. A rotating parachute including an inflating cap and a circular band type canopy, said inflating cap comprising a fabric base, a plurality of cups on the upper surface of said base and a plurality of lines secured to said base and terminating in a single tension line disposed in alignment with the center of said base, said circular band type canopy comprising a plurality of fabric panels secured together in end to end relationship to provide a band surrounding said cap in spaced relation thereto, one end of each panel being free between the inner and outer edges to provide an opening for the passage of air in a direction substantially at right angles to a diameter of said band, each panel when inflated providing an upper surface having an airfoil configuration, radial tapes connecting the peripheral edge of said cap and the ends of each panel, diagonal tapes secured to said radial tapes between the inner periphery of said band and the peripheral edge of said cap and secured to the inner edge of each panel to prevent inversion of said circular band type canopy during inflation and shroud lines connected to the outer periphery of said band at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

10. A rotating parachute including an inflating cap and a circular band type canopy, said inflating cap comprising a fabric base, a plurality of cups on the upper surface of said base and a plurality of lines secured to said base and terminating in a single tension line disposed in alignment with the center of said base, said circular band type canopy comprising a plurality of fabric panels secured together in end to end relationship to provide a band surrounding said cap in spaced relation thereto, one end of each panel being free between the inner and outer edges to provide an opening for the passage of air in a direction substantially at right angles to a diameter of said band, each panel when inflated providing an upper surface having an airfoil configuration, radial tapes connecting the peripheral edge of said cap and the ends of each panel and shroud lines connected to the outer periphery of said band at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

11. A rotating parachute including an inflating cap and a circular band type canopy, said inflating cap comprising a fabric member and a plurality of lines secured to said member and terminating in a single tension line disposed in alignment with the center of said member, said circular band type canopy comprising a plurality of fabric panels secured together in end to end relationship to provide a band surrounding said cap in spaced relation thereto, one end of each panel being free between the inner and outer edges to provide an opening for the passage of air in a direction substantially at right angles to a diameter of said band, each panel when inflated providing an upper surface having an airfoil configuration, radial tapes connecting the peripheral edge of said cap and the ends of each panel and shroud lines connected to the outer periphery of said band at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

12. A rotating parachute including an inflating cap and a circular band type canopy, said inflating cap comprising a fabric member and a plurality of lines secured to said member and terminating in a single tension line disposed in alignment with the center of said member, said circular band type canopy comprising a plurality of fabric panels secured together in end to end relationship to provide a band surrounding said cap in spaced relation thereto, one end of each panel being free between the inner and outer edges to provide an opening for the passage of air in a direction substantially at right angles to a diameter of said band, each panel when inflated providing an upper surface having an airfoil configuration, means connecting said cap and each panel and shroud lines connected to the outer periphery of said band at spaced points and connected at their opposite ends to a swivel, said tension line being connected to said swivel and being of a length to take the entire pull of said cap and relieve said shroud lines of load prior to inflation of said circular band type canopy, said panels providing turbine type blades for causing rotation of said canopy and cap during movement of said parachute through the air.

References Cited in the file of this patent

UNITED STATES PATENTS

| | | |
|---|---|---|
| 1,872,705 | Elliott | Aug. 23, 1932 |
| 2,701,697 | Ewing | Feb. 8, 1955 |
| 2,718,369 | MacMillan | Sept. 20, 1955 |
| 2,770,432 | Stevinson | Nov. 13, 1956 |
| 2,797,885 | Barish | July 2, 1957 |